United States Patent
Ganfield et al.

(10) Patent No.: US 7,617,332 B2
(45) Date of Patent: Nov. 10, 2009

(54) METHOD AND APPARATUS FOR IMPLEMENTING PACKET COMMAND INSTRUCTIONS FOR NETWORK PROCESSING

(75) Inventors: Paul Allen Ganfield, Rochester, MN (US); Kent Harold Haselhorst, Byron, MN (US); Kerry Christopher Imming, Rochester, MN (US); John David Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 10/427,865

(22) Filed: May 1, 2003

(65) Prior Publication Data

US 2004/0221066 A1 Nov. 4, 2004

(51) Int. Cl.
*G06F 3/00* (2006.01)
*G06F 15/16* (2006.01)

(52) U.S. Cl. .............................. 710/5; 710/30; 710/52; 710/56; 709/250; 370/218

(58) Field of Classification Search ....................... None
See application file for complete search history.

(56) References Cited

U.S. PATENT DOCUMENTS

| | | | | |
|---|---|---|---|---|
| 3,979,719 A | * | 9/1976 | Tooley et al. | 714/748 |
| 4,967,344 A | * | 10/1990 | Scavezze et al. | 714/4 |
| 5,001,705 A | * | 3/1991 | Kobatake et al. | 370/389 |
| 5,367,643 A | * | 11/1994 | Chang et al. | 710/62 |
| 5,956,020 A | * | 9/1999 | D'Amico et al. | 345/173 |
| 6,510,474 B1 | * | 1/2003 | Stracovsky et al. | 710/58 |
| 6,847,645 B1 | * | 1/2005 | Potter et al. | 370/392 |
| 6,850,999 B1 | * | 2/2005 | Mak et al. | 710/39 |
| 7,254,687 B1 | * | 8/2007 | Jeter et al. | 711/163 |
| 2001/0027494 A1 | * | 10/2001 | Deo et al. | 709/247 |
| 2001/0036180 A1 | * | 11/2001 | Kato et al. | 370/386 |
| 2002/0019902 A1 | * | 2/2002 | Christie | 710/260 |
| 2003/0058880 A1 | * | 3/2003 | Sarkinen et al. | 370/413 |
| 2004/0037276 A1 | | 2/2004 | Henderson et al. | |
| 2004/0073635 A1 | | 4/2004 | Narad et al. | |
| 2004/0120486 A1 | * | 6/2004 | Creamer et al. | 379/102.01 |

OTHER PUBLICATIONS

Broussard, Method for Developing High Level Programming Interface Capabilities, Jan. 1, 1992, 107-109.*

* cited by examiner

*Primary Examiner*—Tariq Hafiz
*Assistant Examiner*—Dean Phan
(74) *Attorney, Agent, or Firm*—Joan Pennington

(57) ABSTRACT

A method, apparatus and computer program product are provided for implementing packet command instructions for network processing. A set of packet commands is provided. Each packet command defines a corresponding packet operation. A command from the set of packet commands is issued to perform the defined corresponding packet operation. A packet buffer structure hardware is provided for performing one or more predefined packet manipulation functions responsive to the issued command.

18 Claims, 13 Drawing Sheets

PACKET COMMANDS
200

| FUNCTION | MNEMONIC |
|---|---|
| ALLOCATE PACKET | PKT_ALLOCATE(PT,POOLID) |
| SPLIT PACKET | PKT_SPLIT(PT,PS,OFFSET) |
| PACKET TAIL | PKT_TAIL(PT,PS,OFFSET) |
| JOIN PACKETS | PKT_JOIN(PT,PS) |
| HEADER DELETE | PKT_HDR_DELETE(PT,N) |
| ENQUEUE PACKET | PKT_ENQUEUE(QUEUE,PS) |
| ENQUEUE MULTICAST PACKET | PKT_ENQUEUE_MC(QUEUE,PS) |
| DISCARD PACKET | PKT_DISCARD(PS) |
| PACKET ACCEPT | PKT_ACCEPT(PT) |
| DEQUEUE PACKET | PKT_DEQUEUE(PT,GROUP,MASK) |
| LINK PACKETS | PKT_LINK(PT,PS,OFFSET) |
| COPY PACKET | PKT_COPY(PT,PS) |
| SYCNHRONIZE | PKT_SYNC |
| LOAD/PACKET DATA | LW PT,OFFSET(PWA(N)) |
| STORE PACKET DATA | STW PT,OFFSET(PWA(N)) |

FIG. 2

PACKET CONDITION
REGISTER 300

| CR0 0 | CR1 4 | CR2 8 | CR3 12 | CR4 16 | CR5 20 | CR6 24 | CR7 28 |
|---|---|---|---|---|---|---|---|

PACKET STORAGE INTERRUPT STATUS REGISTER (PSISR) 310

| PSSIR0 | PSSIR1 | PSSIR2 | PSSIR3 | PSSIR4 | * | * | * | PSSIR (N) |
|---|---|---|---|---|---|---|---|---|

FIG. 3A

BIT DEFINITION 312 FOR PACKET
CONDITION REGISTER 300

| BIT | FIELD | DESCRIPTION |
|---|---|---|
| 0 | BUSY | THIS PSR IS THE TARGET OF A PACKET COMMAND THAT HAS NOT YET COMPLETED. SOFTWARE CAN POLL THIS BIT TO DETERMINE WHEN A COMMAND THAT TARGETS A SPECIFIC PSR HAS COMPLETED |
| 1:3 | STATE | 000=NORMAL<br>001=MULTI-CAST<br>010=LINKED<br>011=MESSAGE<br>100=RESERVED<br>101=RESERVED<br>110=CORRUPT<br>111=NULL |

PACKET ALLOCATE
COMMAND FORMAT 400

| X'10' | PT | 0 | 0 | POOL_ID |
|---|---|---|---|---|
| 0 | 6 | 11 | 16 | 28 |

IF BUFFER_AVAILABLE(POOL_ID)
    PT <- [NEW_PACKET_ID]
    PT.LENGTH <- 0
ELSE
    PT <- NULL

PACKET COPY COMMAND
FORMAT 500

| X'1B' | PT | PS | 0 |
|---|---|---|---|
| 0 | 6 | 11 | 16 |

[PT] <- [PS]
PT.STATE <- NORMAL

FIG. 5

PACKET COPY COMMAND EXAMPLE 600
BEFORE PKT_COPY:
PS:  0 ——— L-1
SEGMENT A
PT:  0 ——— X-1
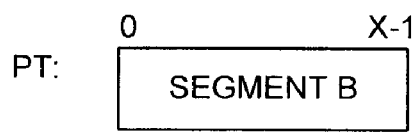
SEGMENT B
L = LENGTH OF [PS]
X = LENGTH OF [PT] (MAY BE NULL)
AFTER PKT_COPY:
PS:  0 ——— L-1
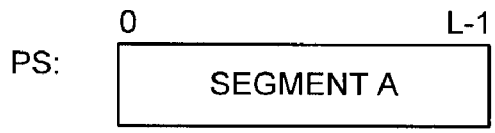
SEGMENT A
PT:  0 ——— L-1
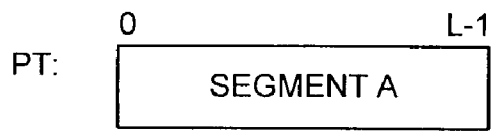
SEGMENT A
FIG. 6

PACKET SPLIT COMMAND FORMAT 700
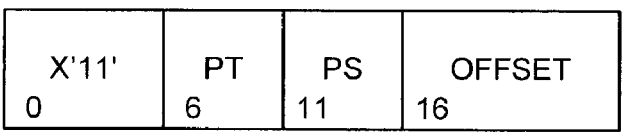
PT = PT || PS[0..OFFSET-1];
PT.LENGTH <- PT.LENGTH + OFFSET;
PS = PS[OFFSET...PACKET.LENGTH - 1];
PS.LENGTH <- PS.LENGTH - OFFSET;
FIG. 7
PACKET SPLIT COMMAND EXAMPLE 800
BEFORE PKT_SPLIT:
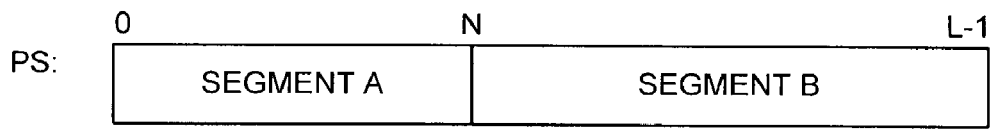
PS:
PT:
L = LENGTH OF [PS]
X = LENGTH OF [PT] (MAY BE NULL)
N = OFFSET OF SPLIT
AFTER PKT_SPLIT:
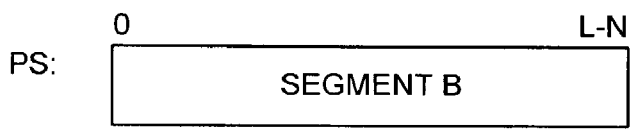
PS:
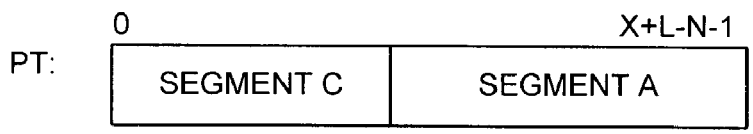
PT:
FIG. 8

PACKET TAIL COMMAND FORMAT 900

PACKET TAIL COMMAND EXAMPLE 1000

PACKET JOIN COMMAND FORMAT 1100

PACKET JOIN COMMAND EXAMPLE 1200

PACKET HEADER DELETE COMMAND FORMAT 1300
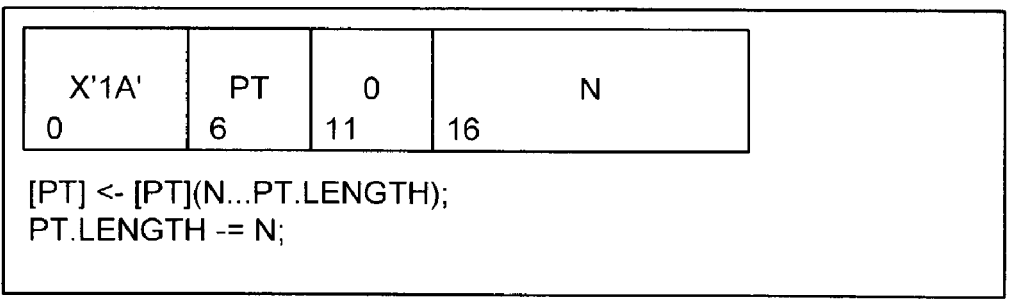
[PT] <- [PT](N...PT.LENGTH);
PT.LENGTH -= N;
FIG. 13
PACKET HEADER DELETE COMMAND EXAMPLE 1400
BEFORE HDR_DELETE:
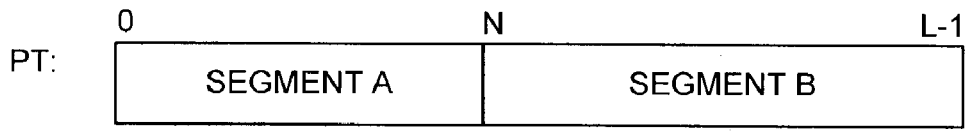
AFTER HDR_DELETE:
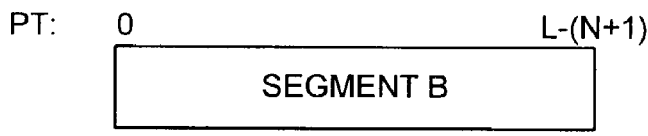
L = LENGTH OF [PT]
X = LENGTH OF BYTES DELETED
FIG. 14

PACKET DEQUEUE MESSAGE COMMAND FORMAT 2000

| X'1E' | PT | '11111' | QUEUE_MASK |
|---|---|---|---|
| 0 | 6 | 11 | 16 |

PT = NULL;
i = 0;
WHILE ((PT == NULL) && (i < 16)) {
    IF (QUEUE_MASK(i) == 1)
    PT <- QUEUE[GROUP*16+i](HEAD++)
    i++;
}

FIG. 20

PACKET DISCARD COMMAND FORMAT 2100

| X'16' | 0 | PS | X'FFFF' |
|---|---|---|---|
| 0 | 6 | 11 | 16 |

IF MCC > 0
    MCC--;
ELSE
    QUEUE(DISCARD) <=[PS]
    PS <- NULL

FIG. 21

PACKET ACCEPT COMMAND FORMAT 2200

| X'1C' | PT | 0 | X'0000' |
|---|---|---|---|
| 0 | 6 | 11 | 16 |

REMOVE QUEUE(ORDERING)

FIG. 22

METHOD AND APPARATUS FOR IMPLEMENTING PACKET COMMAND INSTRUCTIONS FOR NETWORK PROCESSING

FIELD OF THE INVENTION

The present invention relates generally to the data processing field, and more particularly, relates to a method, apparatus and computer program product for implementing packet command instructions for network processing.

RELATED APPLICATIONS

Related United States patent applications assigned to the present assignee are being filed on the same day as the present patent application including:

U.S. patent application Ser. No. 10/427,864, U.S. Pat. No. 7,240,166 issued Jul. 3, 2007, by Paul Allen Ganfield, and entitled "METHOD AND APPARATUS FOR IMPLEMENTING PACKET WORK AREA ACCESSES AND BUFFER SHARING"; and U.S. patent application Ser. No. 10/427,886, by Kent Harold Haselhorst, Kerry Christopher Imming, and John David Irish, and entitled "METHOD AND APPARATUS FOR IMPLEMENTING VIRTUAL PACKET STORAGE VIA PACKET WORK AREA".

DESCRIPTION OF THE RELATED ART

One of the main functions of a network processor is to take incoming packets or frames, and perform manipulations or alterations on the headers and payloads for the purpose of implementing certain network protocols as required by a particular application. These operations can be done in the core processor but results in a user application that is tightly coupled to a specific network processor implementation. Since these operations may involve the manipulation of multiple data structures, many processor instructions are involved to complete. As a result, these operations consume a significant portion of the available processing power.

A need exists for an improved mechanism for implementing network processing. A need exits for such a mechanism that enables higher performance, minimizing required processor operations.

SUMMARY OF THE INVENTION

A principal object of the present invention is to provide a method, apparatus and computer program product for implementing packet command instructions for network processing. Other important objects of the present invention are to provide such a method, apparatus and computer program product for implementing packet command instructions for network processing substantially without negative effect and that overcome many of the disadvantages of prior art arrangements.

In brief, a method, apparatus and computer program product are provided for implementing packet command instructions for network processing. A set of packet commands is provided. Each packet command defines a corresponding packet operation. A command from the set of packet commands is issued to perform the defined corresponding packet operation. A packet buffer structure hardware is provided for performing one or more predefined packet manipulation functions responsive to the issued command.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 illustrates an exemplary list of packet commands in accordance with the preferred embodiment;

FIG. 3A illustrates an exemplary packet condition register and a packet storage interrupt status register (PSISR) in accordance with the preferred embodiment;

FIG. 3B illustrates a bit definition for the packet condition register of FIG. 3A in accordance with the preferred embodiment;

FIGS. 4-23 illustrates exemplary packet command formats and exemplary packet command examples of the packet commands of FIG. 2.

DETAILED DESCRIPTION OF THE PREFERRED EMBODIMENTS

Figure 1:
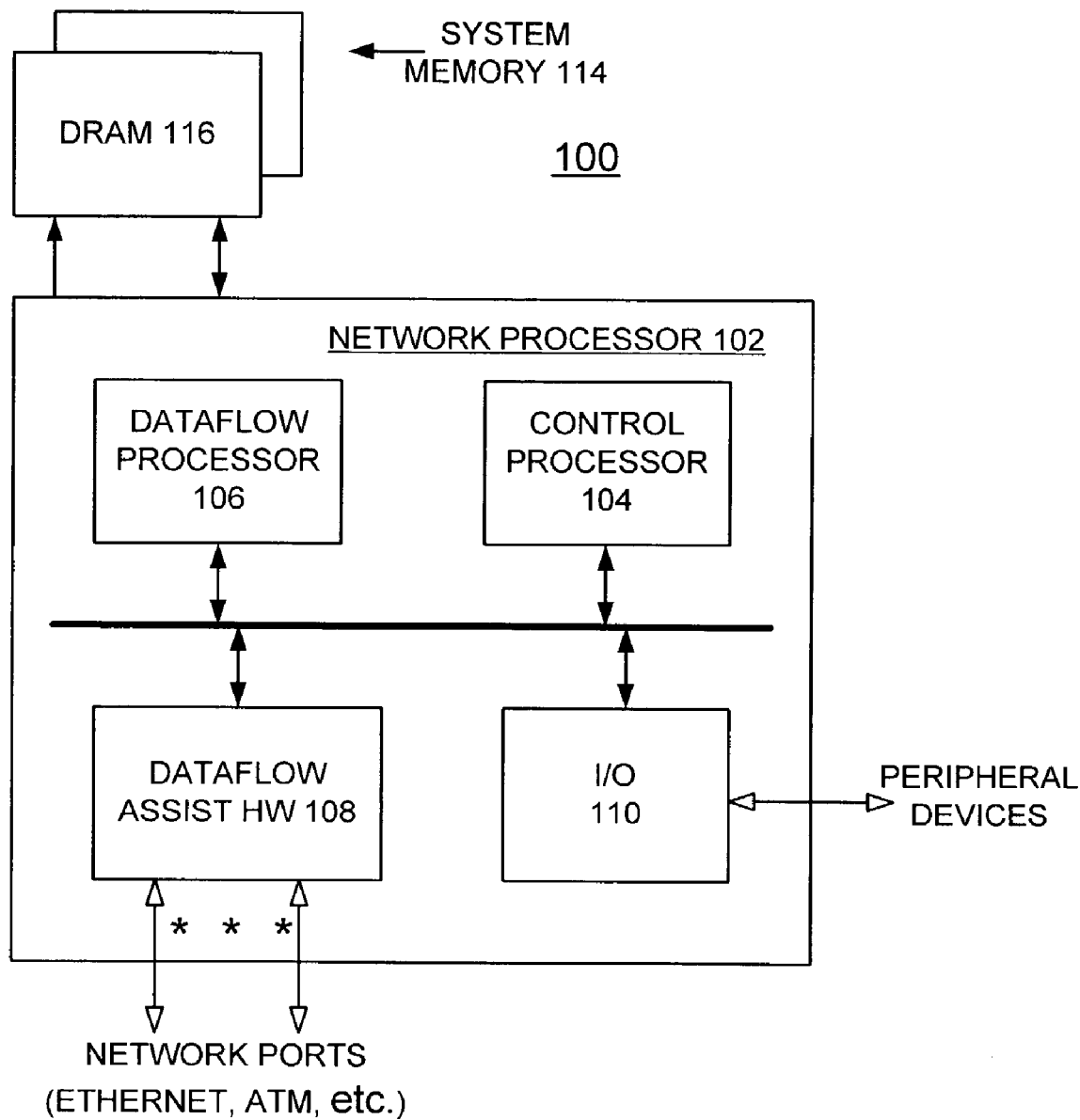
FIG. 1 is a block diagram representation illustrating a network processor system for implementing packet command instructions for network processing in accordance with the preferred embodiment.

Having reference now to the drawings, in FIG. 1, there is shown a network processor system generally designated by the reference character 100 for carrying out methods for implementing packet command instructions for network processing of the preferred embodiment. As shown in FIG. 1, network processor system 100 includes a network processor 102 coupled to multiple network ports for communicating using known network protocols, such as, an Asynchronous Transfer Mode (ATM), Ethernet, and the like. Network processor 102 includes a control processor 104, a dataflow processor 106 coupled by a network processor bus to dataflow assist hardware (HW) 108 coupled to the network ports and an input/output (I/O) 110 coupled to peripheral devices. Network processor system 100 includes a system memory 114 including a dynamic random access memory (DRAM) 116.

Network processor 102 can be implemented with various standard processors, for example, with one of the PowerPC® line of processors manufactured by International Business Machines Corporation.

In accordance with features of the preferred embodiment, a set of commands or instructions is provided for manipulating packet data within network processor 102. Designated logic 108 performs manipulations on frames as instructed by the dataflow or core processor 106 enabling higher performance than conventional network processor arrangements. This logic 108 is controlled by the set of packet commands. These commands constitute an application programming interface (API) that provides an abstraction layer that decouples software from a specific hardware implementation. Software issues a command to perform a specific packet operation, for example, split a packet in two fragments, and dataflow assist hardware 108 provides the multiple operations required to find the split point and create the two resulting fragments. The abstraction enables a range of performance levels in dataflow assist hardware 108 and allows future implementation optimizations without impacting user software. The control structure manipulation required to complete the packet operation is performed by the dataflow assist hardware 108 while the processor 106 is free to continue processing. A command queue is provided along with hardware enforced command interlocks such that software can issue a sequence of commands without waiting for the individual commands to complete. The command set is defined to enable all packet manipulations needed to implement current network protocols. The current command set can easily be extended if any new packet manipulation functions are required in future network processors.

In accordance with features of the preferred embodiment, the packet command set allows user software to manipulate packet data in an abstract data view, decoupling user code from a specific hardware implementation. The hardware independence allows a range of performance levels and provides for future implementation optimizations without impacting user code. The hardware implementation executes these commands with pointer manipulations, eliminating any unnecessary copying of the data. Avoiding data copying conserves precious memory bandwidth, which reduces the product cost associated with providing memory bandwidth (chip pins) and the related power consumption.

This command set of the preferred embodiment is enabled by the flexible buffer structure disclosed in the above-identified patent application entitled METHOD AND APPARATUS FOR IMPLEMENTING VIRTUAL PACKET STORAGE VIA PACKET WORK AREA. The subject matter of the above-identified patent application is incorporated herein by reference.

FIG. 2 illustrates an exemplary set of high-level commands for operating on packet data generally designated by reference character 200 of the preferred embodiment. These commands are issued by the processor by writing a 32-bit packet command to a Packet Command register PKT_Cmd). The commands are identified by opcode and the packets are referenced by specifying a packet segment register (PSR) that holds the packet ID (PID). An immediate field is also provided to hold an offset into the packet where the operation is to occur. The following Table 1 shows a list of these commands together with a description of operation.

TABLE 1

Packet Commands

| Function | Minemonic | Operation |
| --- | --- | --- |
| Allocate Packet | PKT_allocate(PT,PoolID) | Allocate a storage area for packet data |
| Split Packet | PKT_split(PT,PS,offset) | Split packet PS at byte "offset" within the packet and append the first part to packet PT. |
| Packet Tail | PKT_tail(PT,PS,offset) | Split packet PS at byte "offset" within the packet and append the tail to packet PT. |
| Join Packets | PKT_join(PT,PS) | Append packet PS onto packet PT. |
| Header Delete | PKT_hdr_delete(PT,N) | Delete N bytes from the head of packet PT |
| Enqueue Packet | PKT_enqueue(queue,PS) | Enqueue packet PS onto "queue" |
| Enqueue Multi-cast Packet | PKT_enqueue_MC(queue,PS) | Enqueue packet PS onto "queue" and keep packet PT for additional operations. |
| Discard Packet | PKT_discard(PS) | Discard packet PS, freeing any allocated resources. |
| Packet Accept | PKT_accept(PT) | Remove packet PT from the ordering queue. |

TABLE 1-continued

Packet Commands

| Function | Minemonic | Operation |
| --- | --- | --- |
| Dequeue Packet | PKT_dequeue (PT, group, mask) | Accept the packet at the head of queue indicated by group and mask into PT. |
| Link Packets | PKT_link(PT,PS,offset) | Link packet PT into packet PS, at byte "offset". |
| Copy Packet | PKT_copy(PT,PS) | Copy packet PS into packet PT. |
| Synchronize | PKT_sync | Ensure that interrupts from any outstanding commands have been recorded. |
| Load/Packet Data | lw PT,offset(PWA(n)) | Load packet data into a processor register from "offset" within the memory mapped PWA. PWA(n) represents a base register initialized to the origin of the correct PWA. Any valid load instruction and addressing mode can be used for lw. |
| Store Packet Data | stw PT,offset(PWA(n)) | Store data into a packet at "offset" within the memory mapped PWA. (PWA(n))represents a base register initialized to the of the correct PWA. Any valid store instruction and addressing mode can be used for stw. |

The Load/Store packet data commands are executed as processor load/store instructions, not written to the Packet Command Register.

Referring now to FIGS. 3A and 3B, an exemplary packet condition register generally designated by reference character 300 and a packet storage interrupt status register (PSISR) generally designated by reference character 310 are shown in FIG. 3A. FIG. 3B provides an exemplary bit definition generally designated by reference character 312 for the packet condition register 300 in accordance with the preferred embodiment. Packets have an associated state that determines which type of packet operations are allowed as follows: A Normal state is the default state of a packet. A Multi-cast state for a packet is Read Only because other packets link into the packet, or because the packet is enqueued with a PKT_enqueue_MC command and is also referred to as a reference packet. A Linked state defines a packet that is linked to a multi-cast packet that cannot be used as the operand for another PKT_link command.

The Packet Condition register 300 allows software to query the status of a packet referenced by PSR. The packet condition register 300 has 4 bits, a 3-bit state and a busy bit, per PSR. CR0 . . . 7 is associated with PSR0 . . . 7. The packet states are Normal, Multi-Cast, Linked, Corrupt, and NULL. Loading an existing PID into a PSR causes the packet condition register 300 to be updated with the current state. The corresponding CR field will report busy until the state field is correct.

Packet commands appear to execute in the order they are issued by software. The implementation is required to detect any result/operand dependencies and enforce ordering. By the same token, an implementation may reorder commands as long as the results of future commands and packet storage accesses are not affected.

A command that targets a PSR marks that packet and the associated PWA busy in the packet condition register 300 until the command has completed. Any future command dependent on these previous results will be stalled until the previous command completes. If the target of a command cannot be determined by the time a subsequent command is received, all potential targets must be assumed busy until the exact targets can be determined.

To prevent result/operand interlocks from stalling commands, commands that use results from an earlier command should be separated by as much time or instructions as practical. If it is helpful in prioritizing operations, software can query the PSR status in the packet condition register 300 to determine if a command has completed prior to issuing a dependent command.

A Packet Storage Interrupt (PSI) occurs when a packet command or an access to the PWA cannot be completed. A command that causes a PSI will appear not to have executed. A command that causes a PSI will have no other effect on operands or facilities. An exception is the PKT_copy command which may run out of hardware resources after partially executing. Once the error condition has been corrected, restarting (re-executing) the PKT_copy command will produce correct results.

The interrupt cause is defined in the Packet Storage Interrupt Status register (PSISR) 310. The PKT_ID or the PWA address is recorded in a Packet Address register (PAR) (not shown). A Packet Interrupt Command register (PICR) (not shown) records the command that causes the error. The Packet Address register PAR is set to the address of the attempted access if the error was caused by a load or store to the PWA. Otherwise, if the error was caused by a packet command, the Packet Address register is set to the PKT_ID of the packet that caused the error.

Exemplary bit assignments for Packet Storage Interrupt Status register (PSISR) 310 are provided in the following Table 2:

TABLE 2

Example Bit Definitions for PSISR 310

0 - Set 1 if the address recorded in the PAR is a PWA address. In all other cases, the address is a PKT_ID.
1 - Set to 1 if the PICR was loaded with the offending packet command. The PICR is loaded for every packet command that causes an interrupt. PowerPC commands that generate a PSI are not captured since they do not use the PKT_Cmd register.
2 - Set to 1 to indicate that an execution of an invalid instruction was attempted. The PICR is loaded with the offending command.
3 —Set to 1 to indicate that an equeue of a message PID was attempted to RX queue 0-7, a TX queue, or the discard queue.
4 - Set to 1 to indicate that a command was attempted with offset greater than or equal to the packet length.
5 - Set to 1 to indicate that an allocate or dequeue was attempted with PT != NULL.
6 - Set to 1 to indicate that a store was attempted to read-only packet or load or store was attempted to a NULL packet or a message PID. The PWA address is captured in the PAR.
7 - Set to 1 to indicate that a PKT_split, PKT_tail PKT_join, or PKT_hdr_delete command was attempted to a read-only packet or that a PKT_copy was attempted with the target being Read Only.
8 - Set to 1 to indicate that a link command was attempted with a source or target packet in an invalid packet state, or that a PKT_enqueue_MC was attempted to a linked packet.

TABLE 2-continued

Example Bit Definitions for PSISR 310

9 - Set to 1 to indicate that the length specified in the packet control area was greater than the length of the actual packet data. The PID of the offending packet is captured in the PAR.
10 - Set to 1 to indicate than an RX or TX queue overflow occurred.
11 - Set to 1 to indicate that a command failed due to internal hardware resources constraints.
12 - Set to 1 if a packet was lost due to a hardware fault. Examples of such a hardware fault are a parity error in an on-chip SRAM or a parity error in a buffer descriptor in external memory when ECC is not being used.
13 - Set to 1 to indicate that a PKT_Sync instruction has completed execution.
14 - Set to 1 to indicate that a second error has occurred. PICR and PAR record the command and address associated with the FIRST error that occurred. Consequently, a PSISR bit will be set for a second interrupt, but the command and address will not be captured.
15 - Reserved.
16 - Set to 1 to indicate that a PID was enqueued out-of-order. This occurs when the PID enqueued does not match the top of any ordering queues.
17 - Set to 1 to indicate that a packet command was attempted with PSRs containing the same PID. This can occur on any two-operated packet commands (for example, trying to PKT_join a packet to itself.
18 - Set to 1 to indicate that an invalid PID was detected on a write to a PSR. The PID is captured in the PAR.
19 - Set to 1 to indicate that a packet command was attempted using a PSR containing a message PID.

FIGS. 4-23 illustrates exemplary packet command formats and exemplary packet command examples of the packet commands 200 of FIG. 2.

Referring now to FIG. 4, there is shown a packet allocate command format generally designated by reference character 400 in accordance with the preferred embodiment. In the illustrated PKT_allocate(PT, Pool_ID) command format 400, PT indicates a PSR target (PT). PKT_allocate allocates an empty packet by requesting a packet buffer in the specified pool, Pool_ID. A specific size of the allocated buffer is determined, for example, by the "Buffer Size" and "Allocation Sequence" fields in a Global Configuration register. A unique (PID) for the new buffer is returned in PT, the target PSR.

If no buffers are available, the NULL PID is returned in PT and a PSI is generated with PSISR bit 11 set. If initial [PT] !=NULL, a PSI is generated with PSISR bit 5 set.

PKT_allocate creates a new packet that can be used as the target of a PKT_copy, PKT_split, or PKT_tail command. The new packet can also be written to directly to create a packet from scratch.

Referring now to FIGS. 5 and 6, a packet copy command format generally designated by reference character 500 in accordance with the preferred embodiment is shown in FIG. 5. FIG. 6 illustrates a packet copy command example generally designated by reference character 600 in accordance with the preferred embodiment. In the illustrated PKT_copy (PT, PS) command format 500, PS indicates a PSR source (PS). PKT_copy copies packet PS to packet PT. Both packet data and Packet Control Blocks are copied. If PS==NULL, the length of PT is set to 0. If PT==NULL, a new packet is allocated in the same memory pool as PS.

PKT_copy performs a physical copy. Data is physically moved into a new data structure versus shared buffers via pointer manipulation.

Both PS and PT are marked busy while the copy is in progress. Writes to the target packet will be delayed until the requested packet is no longer busy. The target of w=PKT_copy must not be a Read Only packet, or a PSI is generated. If PS==PT, the instruction form is invalid.

Typically, the target of a PKT_copy is a newly allocated packet. If a packet has become fragmented due to PKT_spllit and/or PKT_join operations, the new copy of the packet will be defragmented. Software should always copy to a null packet if defragmentation is desired. In other words, if the target of a copy operation is an existing, fragmented packet, software should assume that the target packet after the PKT_copy command will also be fragmented. Future implementation may not defragment all copy operations.

Referring now to FIGS. 7 and 8, there are shown a packet split command format generally designated by reference character 700 and a packet split command example generally designated by reference character 800 in accordance with the preferred embodiment. The packet split command, PKT_split (PT, PS, offset), splits "offset" bytes from the head of packet PS and appends them to packet PT. If PT==NULL, a new packet is allocated for PT in the same memory pool as PS.

PKT_split splits one packet into two packets. This can be used to repeatedly split the head fragment from a packet for functions like IP Fragmentation or Multi-Link PPP.

The PKT_split command changes the PWA to physical address mapping of the PS and PT packets, thus any cached data for these PWAs must be flushed prior to executing the command or the results will be boundedly undefined. If PS==PT, the instruction form is invalid.

In certain implementations, the PKT_split operation may cause the physical storage holding the payload data of packet PS to become shared with packet PT. In this case, a counter referred to as a Buffer Sharing Counter (BSC) is associated with the shared storage to prevent it from being discarded while it is still being used.

Figure 9:
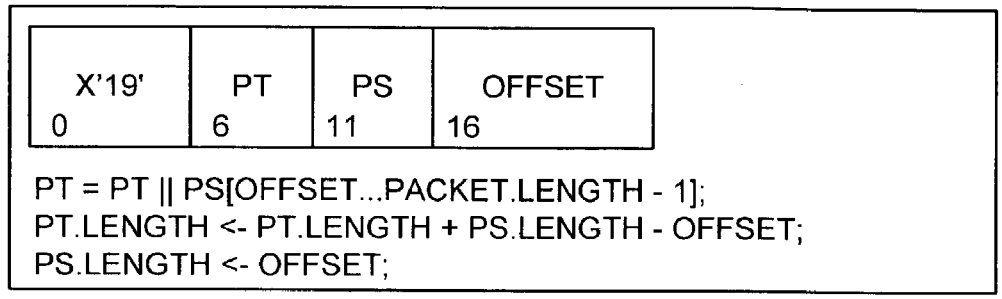
Figure 10:
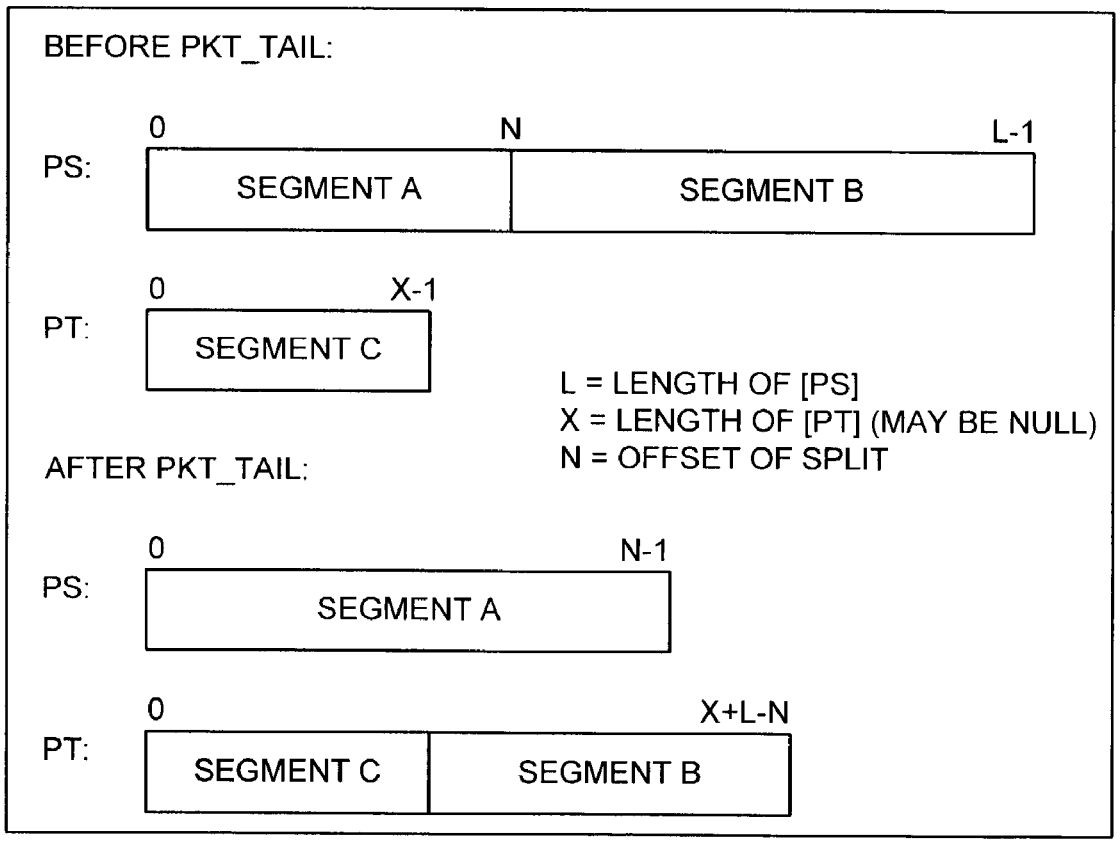

Referring now to FIGS. 9 and 10, there are shown a packet tail command format generally designated by reference character 900 and a packet tail command example generally designated by reference character 1000 in accordance with the preferred embodiment. The packet tail command PKT_tail (PT, PS, offset) splits the tail from packet PS at offset "offset" within the packet data and appends it to packet PT. If PT==NULL, a new packet is allocated in the same memory pool as PS.

PKT_tail splits one packet into two packets. This can be used as a flexible frame alteration that allows any number of bytes of data to be inserted into a packet with a series of PKT_tail and PKT_join commands.

This PKT_tail command changes the PWA to physical address mapping of the PS and PT packets, thus any cached data for these PWAs must be flushed prior to executing the command or the results will be boundedly undefined. If PS==PT, the instruction form is invalid.

In certain implementations, the PKT_tail operation may cause the physical storage holding the payload of packet PS to become shared with packet PT. In this case, a counter referred to as a Buffer Sharing Counter (BSC) will be with the shared storage to prevent it from being discarded while it is still being used.

Figure 11:
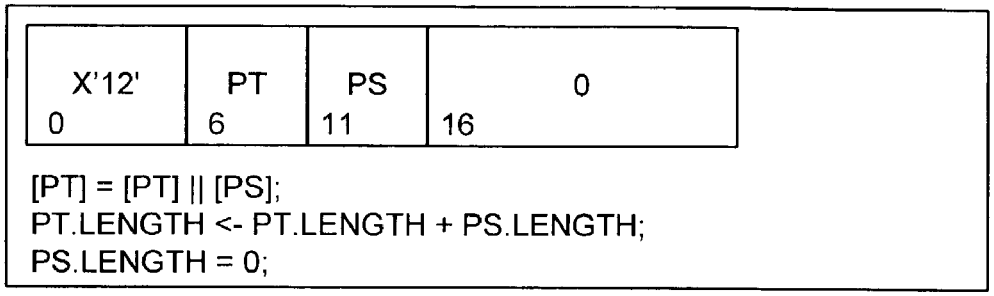
Figure 12:
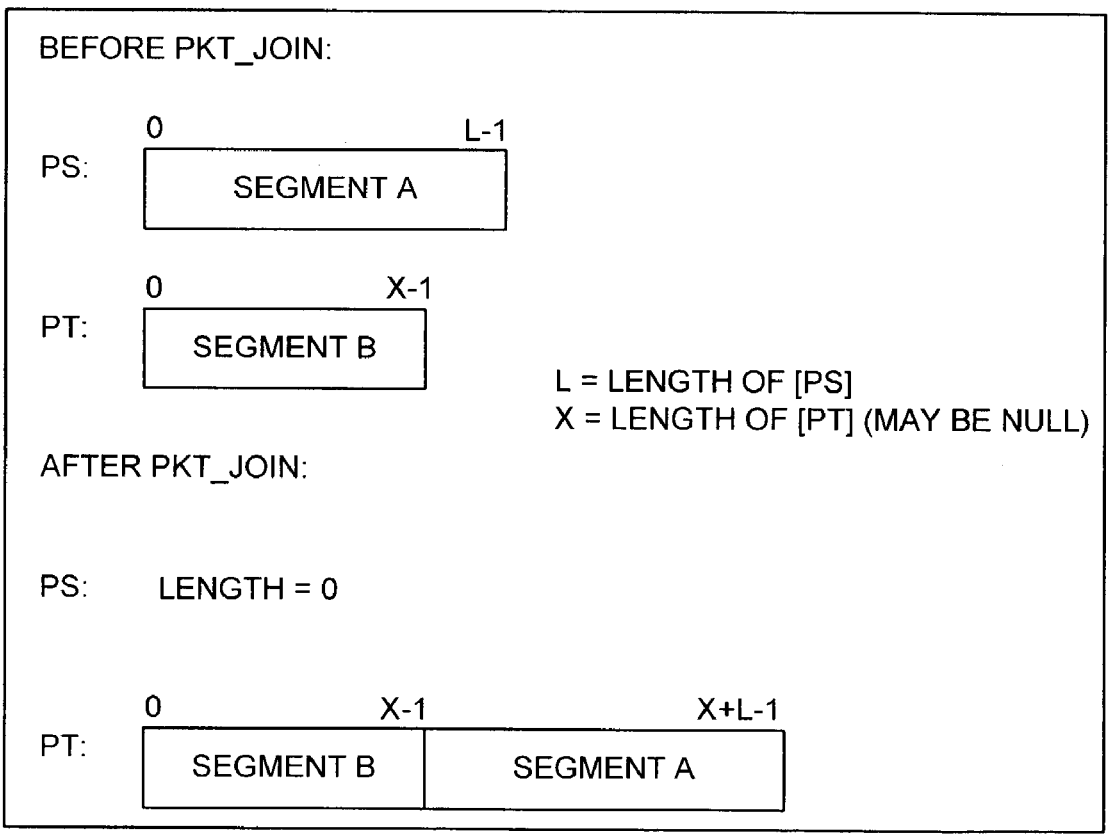

Referring now to FIGS. 11 and 12, there are shown a packet join command format generally designated by reference character 1100 and a packet join command example generally designated by reference character 1200 in accordance with the preferred embodiment. The packet join command PKT_join (PT, PS) joins packet PS to the tail of packet PT. PS is set to a zero-length packet. If PT==NULL, a new packet is allocated in the same memory pool as PS.

PKT_join concatenates two packets into one. This can be used as a flexible frame alteration that would allow any number of bytes of data to be inserted into a packet with a series of PKT_split and PKT_join commands.

The PKT_join command changes the PWA to physical address mapping of the PS and PT packets, thus any cached data for these PWAs must be flushed prior to executing the command of the results will be boundedly undefined.

Referring now to FIGS. 13 and 14, there are shown a packet header delete command format generally designated by reference character 1300 and a packet header delete command example generally designated by reference character 1400 in accordance with the preferred embodiment. The packet header delete command PKT_hdr_delete (PT, N) deletes N bytes from the head of packet PT. If N>PT length, the resultant PT will be a zero-length packet.

The packet header delete command provides an accelerated header delete function which, in some implementations, is significantly more efficient than the PKT_allocate, PKT_split, PKT_discard sequence that would otherwise be required. In some implementations, PKT_hdr_delete results in a simple change to a pointer in a buffer descriptor for the common case of an unfragmented packet.

Figure 15:
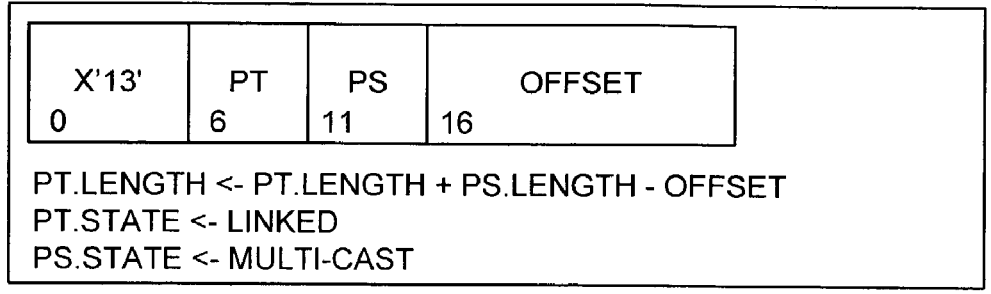
Figure 16:
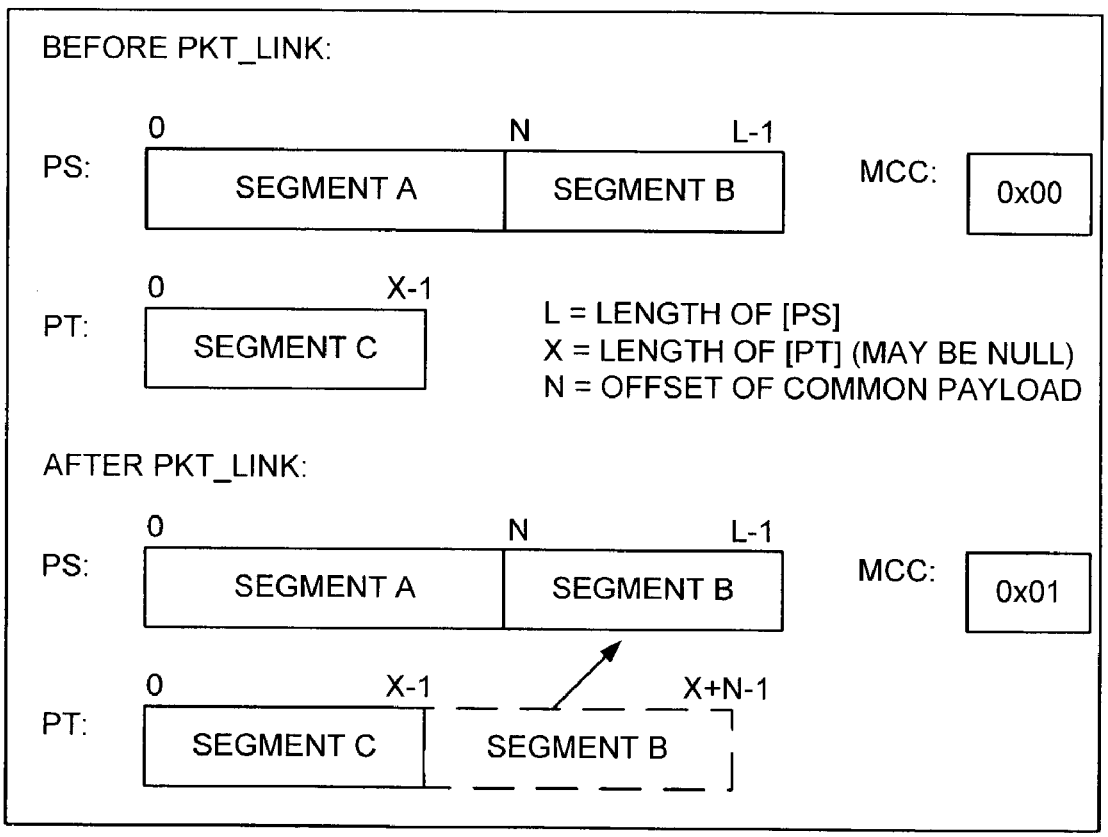

Referring now to FIGS. 15 and 16, there are shown a packet link command format generally designated by reference character 1500 and a packet link command example generally designated by reference character 1600 in accordance with the preferred embodiment. The packet link command PKT_link (PT, PS, offset) links packet PS at offset "offset" to the tail of packet PT. Part of packet PS is now shared between packets PS and PT. If PT==NULL, a new packet is allocated in the same memory pool as PS.

PKT_link creates two packets with a common payload. This is primarily used to create multicast packets by creating a new header in packet PT and linking the payload, at "offset" within PS, to the new header. After a PKT_link command is executed, a counter is associated with packet PS. This counter, which is called a Multicast Counter (MCC), keeps track of the number of packets sharing the common payload. Each time the payload of packet PS is linked to a new PT, the MCC is incremented. The MCC is used by hardware to prevent the PS's payload from being discarded while it is linked to one or more packets. The MCC itself cannot be accessed directly by software.

Figure 17:
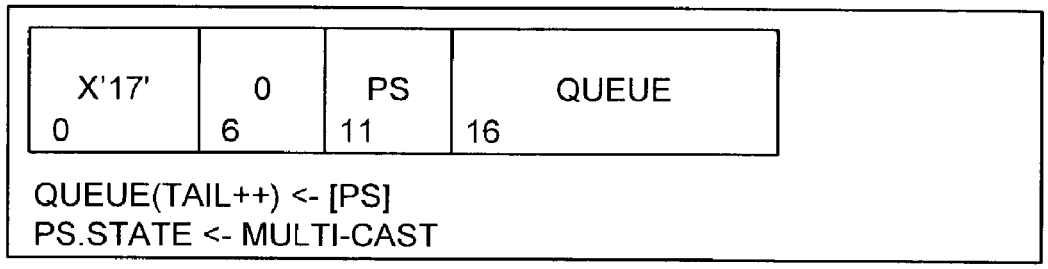

Referring now to FIG. 17, there is shown a packet enqueue for multicase command format generally designated by reference character 1700 in accordance with the preferred embodiment. The packet enqueue for multicase command PKT_enqueue_MC (queue, PS) enqueues packet PS onto the specified processing/transmit queue. The packet is part of a multi-cast operation and is not marked for deletion.

If the packet being enqueued is zero-length, the enqueue operation completes normally but no data is transferred. If PS==NULL, the operation is no-operationed or no-op'd. If the queue specified is the discard queue, the operation is no-op'd. If PS is a linked packet, a PSI is generated.

Figure 18:
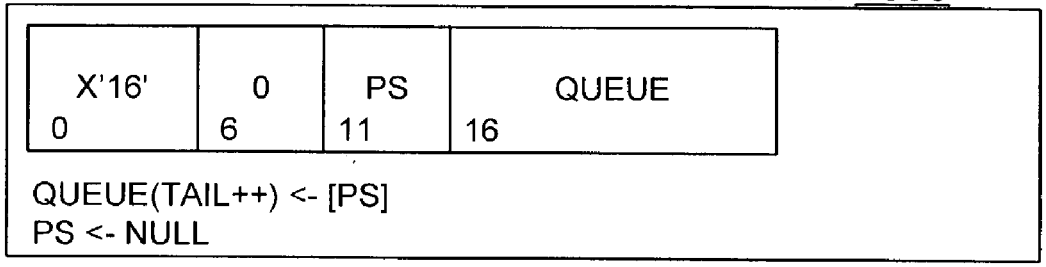

Referring now to FIG. 18, there is shown a packet enqueue, packet enqueue message command format generally designated by reference character 1800 in accordance with the preferred embodiment. The packet enqueue, packet enqueue message command PKT_enqueue[_msg] (queue, PS) enqueues packet PS onto the specified processing/transmit queue. If PS==NULL, the operation is no-op'd. The packet is marked for automatic discard after any processing required by the target queue is complete. Bit 16, the high-order bit of the queue number, indicates the type of queue. For example, 0 indicates an RX queue and 1 indicates a TX queue, the scheduler queue, or the discard queue. If RX queue 511 is specified, this enqueue targets the message queue. Enqueuing a packet (non-message PID) to the message queue produces undefined results.

The packet enqueue message command PKT_enqueue_msg (511, PS) enqueues the message in PSR PS onto the specified message queue.

Figure 19:
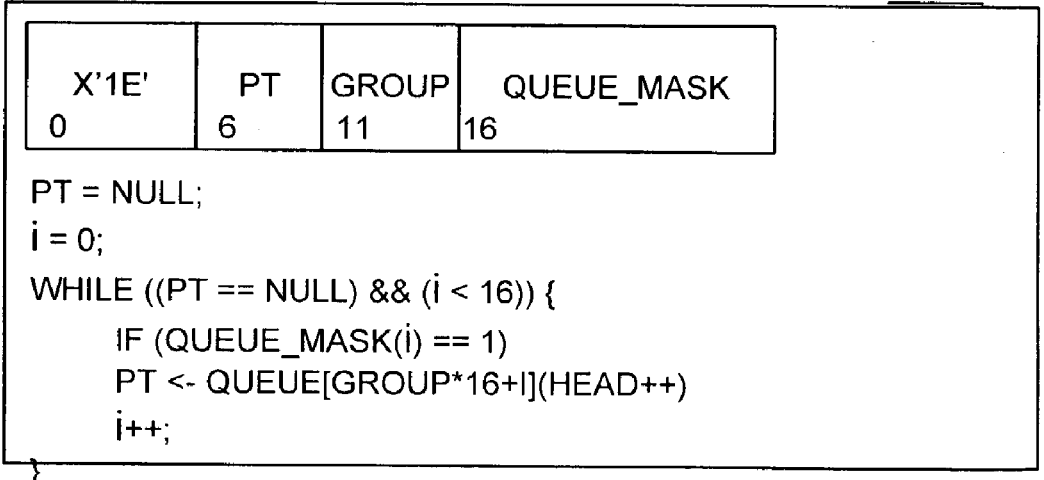

Referring now to FIG. 19, there is shown a packet dequeue command format generally designated by reference character 1900 in accordance with the preferred embodiment. The packet dequeue command PKT_dequeue (PT, queue_group, queue_mask) dequeues the packet from the head of the specified queue and stores the PID into PT. The requested queue is encoded into queue_group and queue_mask. If all requested queues are empty, PT is set to NULL.

The PKT_dequeue command can only dequeue from the Receive queues. In some implementations, for example, the group field must be zero. If a nonexistent queue is specified, PT is set to NULL. If initial [PT]!=NULL, a packet storage interrupt is generated.

Referring now to FIG. 20, there is shown a packet dequeue message command format generally designated by reference character 2000 in accordance with the preferred embodiment. The packet dequeue message command PKT_dequeue_msg (PT, queue_mask) dequeues the message from the head of the specified queue and stores the Message PID into PT. The packet dequeue message command is a subset of the PKT_dequeue instructions with queue_group value set to 0×1F. If all requests queues are empty, PT is set to NULL.

The PKT_dequeue_msg command can only dequeue from the message queues. In some implementations, for example, a single message queue is implemented, so queue_mask must=0×0001. If a nonexistent queue is specified, PT is set to NULL. If initial [PT]!=NULL, a packet storage interrupt is generated.

Referring now to FIG. 21, there is shown a packet discard command format generally designated by reference character 2100 in accordance with the preferred embodiment. The packet discard command PKT_discard (PS) discards packet PS by enqueueing it onto the discard queue. If PS is marked as multicast (multi-case counter (MCC) non-zero), MCC IS DECREMENTED. If PS==NULL, the operation is no-op'd. PKT_discard is a simplified mnemonic for the enqueue instruction with the queue number==x'FFFF', the DISCARD QUEUE.

Referring now to FIG. 22, there is shown a packet accept command format generally designated by reference character 2200 in accordance with the preferred embodiment. The packet accept command PKT_accept (PT) removes packet PT from the receive ordering queue. The packet accept command must be issued by software to keep the packet without enqueuing or discarding. PKT_accept frees up any packets that may be blocked by this packet due to packet ordering requirements. If PT==NULL, the operation is a no-op.

Figure 23:
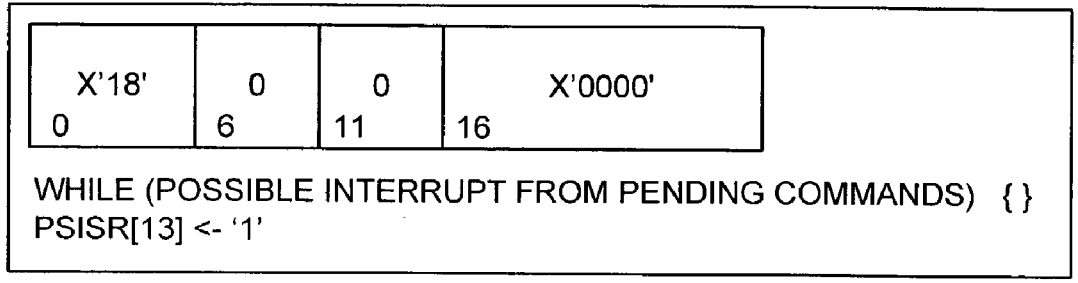

Referring now to FIG. 23, there is shown a packet synchronize command format generally designated by reference character 2300 in accordance with the preferred embodiment. The packet synchronize command PKT_sync waits for any pending commands to complete to insure that no interrupts are possible, then sets PSISR bit 13.

The packet synchronize command is intended for use in the interrupt handler code to insure that all related interrupts are recorded prior to handling the interrupt. Software should clear PSISR bit 13 prior to executing the PKT_sync instruction. PSISR bit 13 can polled or tested later in code for PKT_sync completion.

Figure 24:
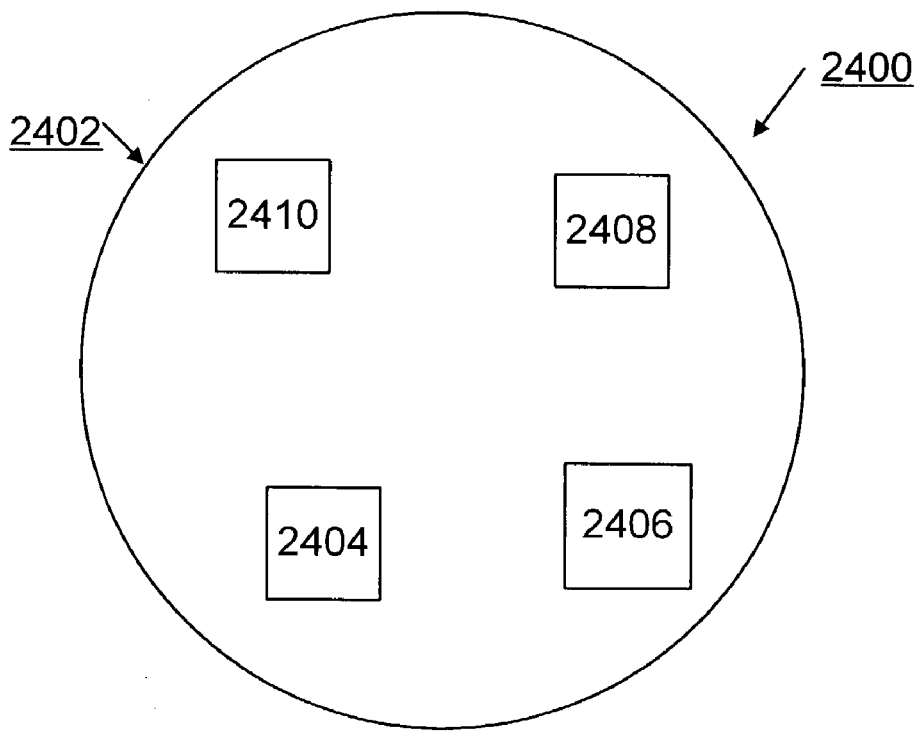
FIG. 24 is a block diagram illustrating a computer program product in accordance with the preferred embodiment.

Referring now to FIG. 24, an article of manufacture or a computer program product 2400 of the invention is illustrated. The computer program product 2400 includes a recording medium 2402, such as, a floppy disk, a high capacity read only memory in the form of an optically read compact disk or CD-ROM, a tape, or a similar computer program product. Recording medium 2402 stores program means 2404, 2406, 2408, 2410 on the medium 2402 for carrying out the methods for implementing packet commands of the preferred embodiment in the system 100 of FIG. 1.

A sequence of program instructions or a logical assembly of one or more interrelated modules defined by the recorded program means 2404, 2406, 208, 2410, direct the network processor system 100 for packet command instructions for network processing of the preferred embodiment.

While the present invention has been described with reference to the details of the embodiments of the invention shown in the drawing, these details are not intended to limit the scope of the invention as claimed in the appended claims.

What is claimed is:

1. A method for implementing packet command instructions for network processing in a network processor system comprising the steps of:
    providing a packet condition register to store packet status and packet state information;
    providing a packet storage interrupt status register to store packet storage interrupt status information;
    defining a set of packet commands, wherein
        each said packet command is identified by opcode and defines a packet operation;
        each said packet command enables predefined packet data manipulation functions by dataflow assist hardware with pointer manipulations;
        said set of packet commands defines an application programming interface (API) to provide an abstraction layer for implementing each of a plurality of said predefined packet data manipulation functions by said dataflow assist hardware with pointer manipulations and for predefined network protocols;
    issuing a packet command from said set of packet commands to perform said defined packet operation by writing said packet command to a packet command register; and
    providing packet buffer structure hardware to store packet data, wherein said packet buffer structure hardware includes:
    said dataflow assist hardware to provide said predefined packet data manipulation functions with pointer manipulations responsive to each said issued packet command, and
    said dataflow assist hardware to perform said predefined packet data manipulation functions to utilize said packet condition register to store said packet status and said packet state information and said packet storage interrupt status register (PSISR) to store said packet storage interrupt status information.

2. A method for implementing packet command instructions for network processing as recited in claim 1 wherein the step of defining said set of packet commands includes defining an allocate packet command, said allocate packet command used to allocate a storage area for packet data.

3. A method for implementing packet command instructions for network processing as recited in claim 1 wherein the step of defining said set of packet commands includes defining a split packet command, said split packet command used to split a source packet and into a pair of target packets.

4. A method for implementing packet command instructions for network processing as recited in claim 1 wherein the step of defining said set of packet commands includes defining a copy packet command, said copy packet command used to copy a source packet and into a target packet.

5. A method for implementing packet command instructions for network processing as recited in claim 1 wherein the step of defining said set of packet commands includes defining a join packets command, said join packets command used to append a source packet onto a target packet.

6. A method for implementing packet command instructions for network processing as recited in claim 1 wherein the step of defining said set of packet commands includes defining a link packets command, said link packets command used to link a target packet into a source packet at a defined byte offset.

7. A method for implementing packet command instructions for network processing as recited in claim 1 wherein the step of defining said set of packet commands includes defining a header delete command, said header delete command used to delete a defined number of bytes from a target packet.

8. A method for implementing packet command instructions for network processing as recited in claim 1 wherein the step of defining said set of packet commands includes defining an enqueue packet command, said enqueue packet command used to enqueue a source packet onto a queue.

9. A method for implementing packet command instructions for network processing as recited in claim 1 wherein the step of defining said set of packet commands includes defining an enqueue multicast packet command, said enqueue multicast packet command used to enqueue a source packet onto a queue and store a target packet for additional operations.

10. A method for implementing packet command instructions for network processing as recited in claim 1 wherein the step of defining said set of packet commands includes defining a discard packet command, said discard packet command used to discard a source packet and free each allocated buffer for said discarded source packet.

11. A method for implementing packet command instructions for network processing as recited in claim 1 wherein the step of defining said set of packet commands includes defining a packet accept command, said packet accept command used to remove a target packet from an ordering queue.

12. A method for implementing packet command instructions for network processing as recited in claim 1 wherein the step of defining said set of packet commands includes defining a dequeue packet command, said dequeue packet command used to accept a target packet at a head of a receive queue.

13. A method for implementing packet command instructions for network processing as recited in claim 1 wherein the step of defining said set of packet commands includes defining a synchronize packet command, said synchronize packet command used to ensure each interrupt from outstanding commands are recorded.

14. A method for implementing packet command instructions for network processing as recited in claim 1 includes executing processor load and storing instructions using said packet buffer structure hardware to load packet data and to store packet data.

15. A method for implementing packet command instructions for network processing as recited in claim 1 includes providing said packet buffer structure hardware to perform hardware enforced ordering of multiple issued commands, and to perform reordering by hardware of multiple issued commands while appearance of program order is maintained.

16. A computer storage medium storing a computer program product for implementing packet command instructions for network processing in a network processor system, said computer program product including a plurality of computer executable instructions stored on said computer storage medium, wherein said instructions, when executed by the network processor system, cause the network processor system to perform the method including the steps of:

defining a set of packet commands, wherein each said packet command is identified by opcode and defines a packet operation;

each said packet command enables predefined packet data manipulation functions provided by dataflow assist hardware with pointer manipulations;

said set of packet commands defines an application programming interface (API) to provide an abstraction layer for implementing each of a plurality of said predefined packet data manipulation functions by said dataflow assist hardware with pointer manipulations and for predefined network protocols;

issuing a packet command from said set of packet commands to perform said defined packet operation by writing said packet command to a packet command register; and providing packet buffer structure hardware to store packet data, wherein said packet buffer structure hardware includes:

said dataflow assist hardware to provide said predefined packet data manipulation functions with pointer manipulations responsive to each said issued packet command, and said dataflow assist hardware to perform said predefined packet data manipulation functions to utilize a packet condition register to store packet status and packet state information and a packet storage interrupt status register (PSISR) to store packet storage interrupt status information.

17. Apparatus for implementing packet command instructions for network processing in a network processor system comprising:

a set of packet commands, wherein each said packet command is identified by opcode and defines a packet operation;

each said packet command enables predefined packet data manipulation functions by dataflow assist hardware with pointer manipulations;

said set of packet commands defines an application programming interface (API) to provide an abstraction layer for implementing each of a plurality of said predefined packet data manipulation functions by said dataflow assist hardware with pointer manipulations and for predefined network protocols;

a processor to issue a packet command from said set of packet commands to perform said defined packet operation by writing said packet command to a packet command register;

packet buffer structure hardware to store packet data, wherein said packet buffer structure hardware includes:

said dataflow assist hardware to provide said predefined packet data manipulation functions with pointer manipulations responsive to each said issued packet command by said processor; and said dataflow assist hardware to perform said predefined packet data manipulation functions to utilize a packet condition register to store packet status and packet state information and a packet storage interrupt status register (PSISR) to store packet storage interrupt status information.

18. Apparatus for implementing packet command instructions as recited in claim 17 wherein said processor issues said command to a packet command register.

* * * * *

UNITED STATES PATENT AND TRADEMARK OFFICE
CERTIFICATE OF CORRECTION

PATENT NO. : 7,617,332 B2 Page 1 of 1
APPLICATION NO. : 10/427865
DATED : November 10, 2009
INVENTOR(S) : Ganfield et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this

Nineteenth Day of October, 2010

David J. Kappos
*Director of the United States Patent and Trademark Office*